Jan. 22, 1957    R. P. SCHOLFIELD    2,778,592
SUPPORT FOR ROTARY FILES
Original Filed Feb. 14, 1950    3 Sheets-Sheet 1
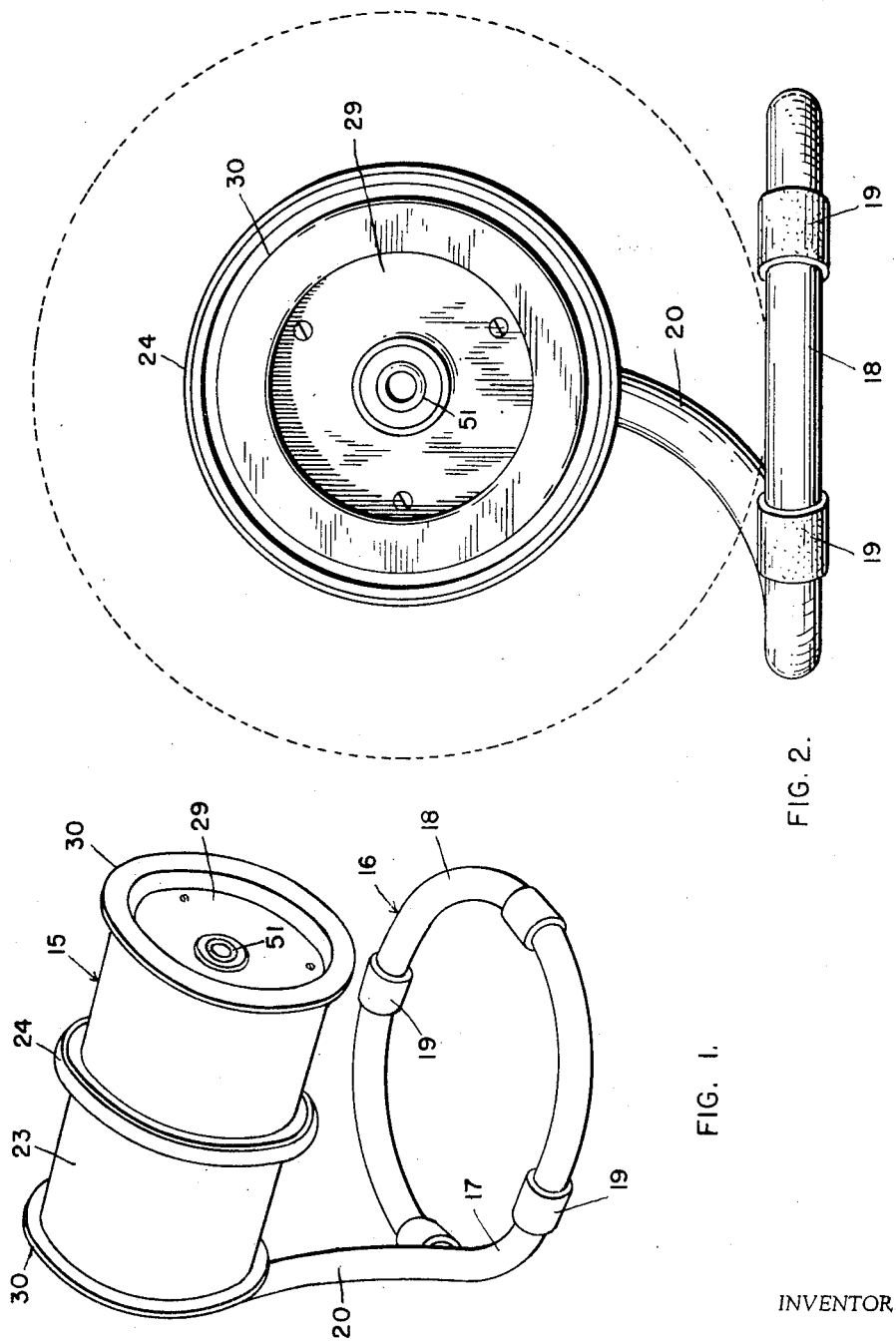
INVENTOR:
Richard P. Scholfield,
BY Cushman, Darby & Cushman
ATTORNEYS Jan. 22, 1957  R. P. SCHOLFIELD  2,778,592
SUPPORT FOR ROTARY FILES
Original Filed Feb. 14, 1950  3 Sheets-Sheet 2

INVENTOR:
Richard P. Scholfield,
BY Cushman, Darby & Cushman
ATTORNEYS

Jan. 22, 1957     R. P. SCHOLFIELD     2,778,592
SUPPORT FOR ROTARY FILES
Original Filed Feb. 14, 1950     3 Sheets-Sheet 3
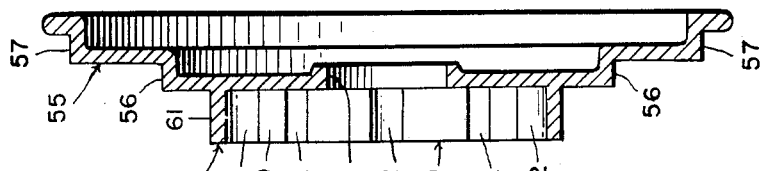
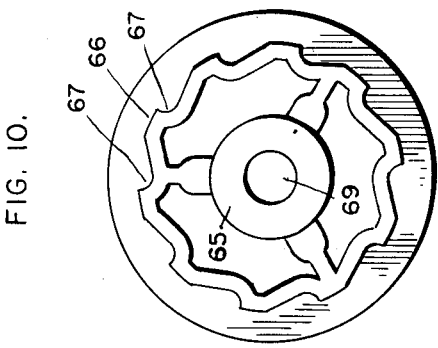
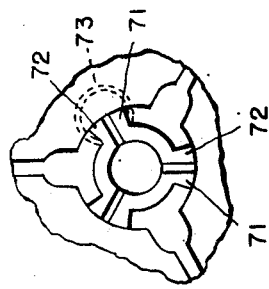
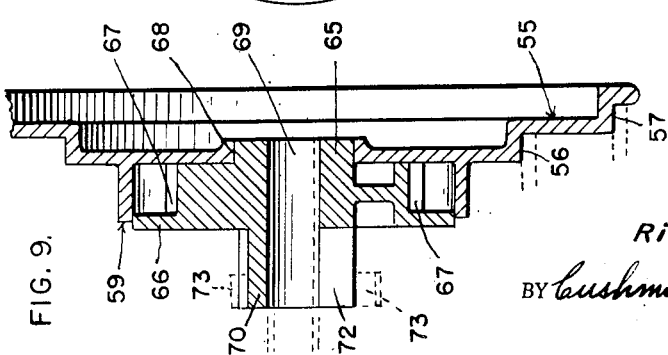
INVENTOR:
Richard P. Scholfield,
BY Cushman, Darby & Cushman
ATTORNEYS.

United States Patent Office 2,778,592
Patented Jan. 22, 1957

2,778,592
SUPPORT FOR ROTARY FILES

Richard P. Scholfield, White Plains, N. Y., assignor to Wheeldex Manufacturing Co., Inc., White Plains, N. Y., a corporation of New York Original application February 14, 1950, Serial No. 144,052. Divided and this application April 16, 1952, Serial No. 282,540

2 Claims. (Cl. 248—158)

This application is a division of my prior application, Serial No. 144,052, filed February 14, 1950 for Portable Rotary File and is directed to the support for the rotary file shown therein.

The support of the present invention is adapted for use with rotary files of the type in which a plurality of filing cards are removably secured upon the periphery of a filing drum, for ready access for inspection or posting by rotating the drum, to bring selected cards quickly to the desired position for access by the operator.

The invention has to do primarily with relatively small, portable rotary files adapted to be positioned upon a desk or table or to be hung from the wall and to be moved from place to place as desired.

The primary object of the present invention is to simplify and to reduce the manufacturing cost of files of the kind shown in my prior Patent No. 2,493,167, dated January 3, 1950.

Another object of the invention is to improve and simplify the supporting stand for a rotary file. To this end, the invention provides a construction in which the supporting stand performs the additional function of providing a shaft or axle upon which the filing drum is mounted for rotation, thereby reducing the cost of manufacture.

A further object of the invention is to improve and simplify the way in which a rotary filing drum may be mounted upon its supporting shaft and to provide improved and simplified means for preventing relative axial movement between the drum and shaft.

Other and further objects and advantages of the invention will become apparent from a consideration of the illustrative embodiments of the invention, shown in the accompanying drawings, in which Figure 1 is a perspective view of a preferred form of the invention;

Figure 2 is an end elevation;

Figure 7 is a fragmentary elevation of a modified form of drum head;

Figure 8 is a section on line 8—8 of Figure 7;

Figure 9 is a radial section of a clutch core member and the drum head of Figure 8, in assembled relation;

Figure 10 is an end elevation of the clutch core member shown in Figure 9, taken substantially on line 10—10 thereof, and Figure 11 is a fragmentary elevation taken from the left of Figure 9.

Figure 3:
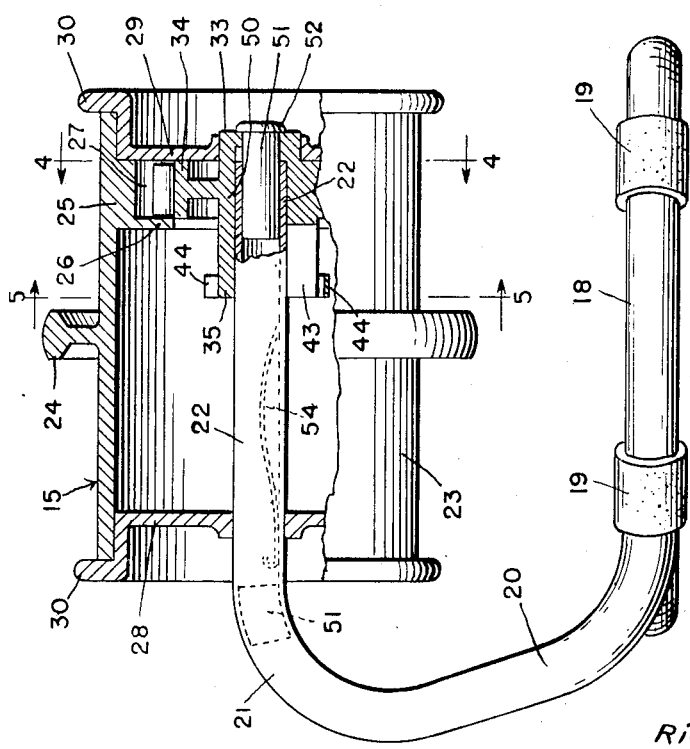
Figure 3 is a side elevation and partial section.

As shown in Figures 1, 2 and 3, the rotary card file of the present invention comprises a drum 15 and a supporting stand 16. The latter preferably comprises a rod 17, which may be solid but which is preferably tubular, having a portion of its length bent to lie in a single plane and constituting a base 18. For the sake of simplicity and pleasing appearance, the base is preferably substantially circular in plan, but any other suitable shape may be employed, so long as the base covers a substantial area, to impart stability to the stand. A plurality of sleeves 19 of cushioning material such as rubber, may be placed on the base, to prevent marring of a supporting surface and to resist slipping, during manipulation of the cards on the drum.

The rod 17 has a portion 20, bent to curve directly and gradually upwardly and laterally from the base 18, merging at its upper end in a gradual lateral and inward curve 21 terminating in an end portion 22, disposed in parallel relation to and above, or within a projection of, the base 18. The end portion 22 of the rod 17 constitutes a supporting shaft or axle for the drum 15.

The drum comprises a cylindrical rim 23, having a card retaining rail 24 associated therewith. Preferably, the rim, is made of molded plastic material, and the rail is integral therewith. Projecting inwardly from the rim, near one end thereof, is an annular flange 25 having an axial extension or ring element 26, formed and shaped to provide a plurality of inwardly facing pockets 27, the left hand ends of which are closed by the flange 25.

A pair of drum heads 28 and 29 have shoulders 30 upon which the rim is mounted and to which it is secured in any suitable manner, as by adhesive, small screws or the like. The left hand drum head 28 may be journalled directly upon the tubular shaft 22, while the right hand head 29 is preferably journalled upon a hub extension 33 of a clutch core element 34. The drum heads are substantially identical and may be formed of plastic material in the same mold. The only difference between the two is that the central opening in the head 29 is bored out on a larger diameter than the opening in the head 28.

The clutch core 34 has a split sleeve hub extension 35, projecting in the opposite direction from the hub 33. The split sleeve preferably comprises three sections 36, 37, and 38, separated by axially extending slots 39, 40, and 41. Each section 36, 37, and 38 is shaped to provide outwardly extending ribs 42 and 43, arranged in pairs on opposite sides of, and adjacent to the slots 39—41.

A spring clip 44 embraces each adjacent pair of ribs 42 and 43, urging them toward each other, tending to close the slots, and contracting the sleeve upon the tubular shaft 22. By shifting the axial positions of the spring clips, their effectiveness may be varied and the frictional resistance to movement of the clutch core on the shaft adjusted with precision. When the clips are adjacent the free ends of the ribs and the open ends of the slots, they are more effective, whereas when they are near the body of the clutch core 34, adjacent the closed ends of the slots, they are less effective and less clamping pressure is applied by the sections 36—38 to the shaft.

Figure 4:
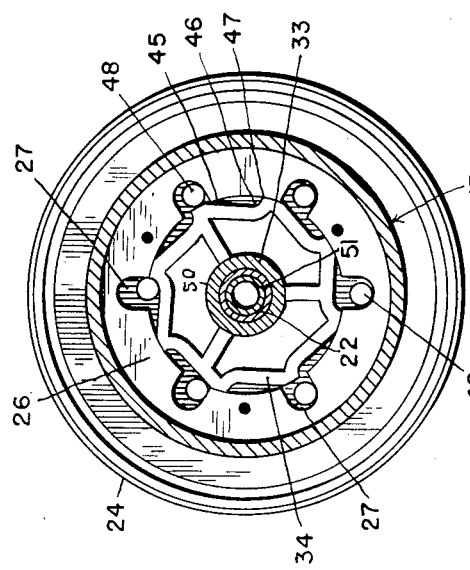
Figure 4 is a radial section on line 4—4 of Figure 3.
Figure 5:
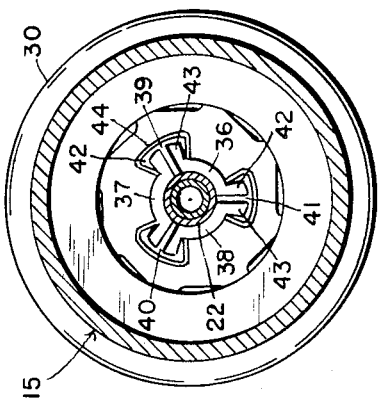
Figure 5 is a similar section on line 5—5 of Figure 3.

The circumferential surface of the clutch core 34 is shaped to provide a plurality of recesses 45, having inclined bottoms 46, each terminating at one end in a shoulder 47. Disposed in each of the pockets 27 is a roller 48. As explained in the above-mentioned Patent No. 2,493,167, when the drum is rotated in the counterclockwise direction, Figure 4, the rollers ride freely along the inclined bottoms of the uppermost recesses 45 and recede into the pockets 27. When an attempt is made to rotate the drum in a clockwise direction, Figure 4, however, one or another of the rollers will jam, substantially immediately, against one of the shoulders 47 of the recesses and against the left hand surface of the associated pocket 27, thereby preventing rotation of the drum relative to the clutch core in this direction. When deliberate turning forces are imparted to the drum, however, the clutch core rotates therewith, under frictional restraint, because of its clamped relation upon the shaft 22.

The outwardly projecting hub extension 33 is provided with a radially inwardly extending projection or flange 50, positioned to abut the end of the tubular shaft 22, to prevent endwise movement of the clutch core relative to the shaft in an inward direction. A tubular plug 51, having a radially projecting flange or bead 52 is forced into the interior of the open end of shaft 22 with a tight frictional fit. The flange or bead 52 engages the end face of the hub 33 of the clutch core and prevents axial movement thereof, relative to the shaft 22, in an outward direction.

The flange 25, projecting inwardly from the rim 23, engages the inner end face of the clutch core 34, while the drum head 29 engages the outer end face thereof, thereby preventing relative axial movement between the drum and the core member.

Disposed within the shaft 22 is a plug 53 of any suitable material, such as cork. Confined within the space between the plug 53 and the tubular plug 51 is a leaf spring 54, arranged to engage the side of a pencil or the like which may be inserted into the shaft 22 through the open end of the tubular plug 51, whereby the shaft serves as a pencil holder.

The modification shown in Figures 8–11 is similar to the first form. The principal difference resides in the construction of the right hand drum head 55. The drum head is provided with two concentric annular shoulders 56 and 57, either of which may serve as the supporting shoulder for a cylindrical rim, depending upon the size of drum desired. The rims, not shown, may comprise simple molded or metal sleeves having a card retaining rail or rails mounted thereon.

Projecting axially inwardly from the central portion 58 of the drum head is a flange 59, having short, concentric arcuate sections 60 and intermediate radially projecting, arched portions 61 providing inwardly facing radial pockets 62, adapted to perform the same functions as the radial pockets 27 in the first form of the invention.

Figure 6:
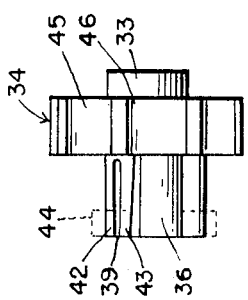
Figure 6 is an elevation of a clutch core member.

The hub member 65 may be substantially identical to the one previously described, except that the body thereof is provided with a radially projecting flange 66, closing the left hand ends of the recesses 67. The hub extension 68, upon which the drum head 58 is journalled for rotation may have a bore 69 of uniform diameter throughout, if it is desired to secure the same upon a supporting shaft by other means than the tubular plug 51, for instance, as shown in Figure 1 or 6 of my Patent 2,493,167. Preferably, the left hand hub extension 70 is split and is provided with ribs 71 and 72, for the reception of spring clips 73, as previously described.

Thus, the one-way clutch element which is rotatable with the drum and which cooperates with the clutch and brake element on the shaft, may be associated with the drum rim, as illustrated in the first form of the invention, or with one of the drum heads, as exemplified in the second form of the invention.

Although two preferred embodiments of the invention have been shown in the drawings and described with considerable particularity in the foregoing specification, it must be understood that the invention is not limited to the specific details of construction shown and described, but includes all modifications coming within the scope of the appended claims and their equivalents.

I claim:

1. A support for a rotary file, comprising a single elongated tubular rod having a substantial portion of its length bent from one free end thereof along a substantially circular line to lie in a single plane, extending over, and substantially enclosing, an area of substantial size and constituting a supporting base, another, intermediate portion of its length bent to curve gradually and directly upwardly and laterally from the other end of said base portion, and another substantially straight terminal portion at the end of the intermediate portion, gradually turned laterally and inwardly therefrom in substantially parallel relation to and spaced from the base portion, within a vertical projection thereof, the terminal portion having a free end and constituting an axle upon which a filing drum may be journalled, and a plug forced into the interior of the free open end of the terminal portion with a tight frictional fit and having a radially projecting flange adapted to retain a drum on said axle.

2. A support in accordance with claim 1, characterized in that said plug is tubular and has both of its ends open.

References Cited in the file of this patent

UNITED STATES PATENTS

| | | |
|---|---|---|
| 556,337 | Dawes | Mar. 17, 1896 |
| 1,692,727 | Gearhart | Nov. 20, 1928 |
| 2,031,278 | Mousseau | Feb. 18, 1936 |
| 2,216,255 | Tate | Oct. 1, 1940 |
| 2,235,986 | Ellingson | Mar. 25, 1941 |
| 2,401,178 | Oehler | May 28, 1946 |
| 2,462,476 | Dowick | Feb. 22, 1949 |

FOREIGN PATENTS

| | | |
|---|---|---|
| 144,920 | Great Britain | of 1920 |